(12) United States Patent
Amemiya (10) Patent No.: US 10,914,365 B2
(45) Date of Patent: Feb. 9, 2021

(54) BALL SCREW SPLINE

(71) Applicant: THK CO., LTD., Tokyo (JP)

(72) Inventor: Yohei Amemiya, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/764,471

(22) PCT Filed: Nov. 12, 2018

(86) PCT No.: PCT/JP2018/041775
§ 371 (c)(1),
(2) Date: May 15, 2020

(87) PCT Pub. No.: WO2019/107122
PCT Pub. Date: Jun. 6, 2019

(65) Prior Publication Data
US 2020/0355249 A1 Nov. 12, 2020

(30) Foreign Application Priority Data

Nov. 28, 2017 (JP) .................................. 2017-227937

(51) Int. Cl.
*F16H 25/24* (2006.01)
*F16H 25/22* (2006.01)
*F16C 31/06* (2006.01)

(52) U.S. Cl.
CPC ......... *F16H 25/2214* (2013.01); *F16C 31/06* (2013.01)

(58) Field of Classification Search
CPC ............................ F16H 25/2214; F16C 31/06
See application file for complete search history.

(56) References Cited

U.S. PATENT DOCUMENTS

| 2007/0000342 | A1 | 1/2007 | Kazuno |
| 2013/0239714 | A1 | 9/2013 | Yamanaka |
| 2018/0363746 | A1 | 12/2018 | Yamamoto et al. |

FOREIGN PATENT DOCUMENTS

| CN | 202851854 U | 4/2013 |
| CN | 103153756 A | 6/2013 |
| CN | 204250144 U | 4/2015 |
| GB | 686319 A | 1/1953 |

(Continued)

OTHER PUBLICATIONS

International Search Report, dated Nov. 12, 2018, from corresponding PCT application No. PCT/JP2018/041775.

(Continued)

*Primary Examiner* — Randell J Krug
(74) *Attorney, Agent, or Firm* — Nixon & Vanderhye (57) ABSTRACT

A ball screw spline with reduced size and weight includes: a shaft formed in such a manner that a helical ball screw groove and a straight ball spline groove intersect each other; a ball screw nut having a helical ball screw groove facing the ball screw groove in the shaft, the ball screw nut being configured to allow recirculating a screw ball fitting in the ball screw groove in the shaft; and a ball spline outer race having a straight ball spline groove facing the ball spline groove in the shaft, the ball spline outer race being configured to allow recirculating a spline ball fitting in the ball spline groove in the shaft. The ball screw groove in the shaft is made as deep as or deeper than the ball spline groove in the shaft, and the screw ball is made smaller in diameter than the spline ball.

6 Claims, 9 Drawing Sheets

(56) References Cited

FOREIGN PATENT DOCUMENTS

| | | |
|---|---|---|
| JP | S62-165057 A | 7/1987 |
| JP | H01-229160 A | 9/1989 |
| JP | 2006-090421 A | 4/2006 |
| JP | 2009-079656 A | 4/2009 |
| JP | 2011-112206 A | 6/2011 |
| JP | 2011112206 A * | 6/2011 |
| WO | 2017/138117 A1 | 8/2017 |

OTHER PUBLICATIONS

Office Action issued in Korean Patent Application No. 10-2020-7014846 dated Aug. 28, 2020 with English translation provided.
Office Action issued in Chinese Patent Application No. 201880076242.5 dated Nov. 30, 2020 with English translation provided.

* cited by examiner

BALL SCREW SPLINE

TECHNICAL FIELD

The present invention relates to a ball screw spline used for, for example, a Z-θ actuator for an industrial robot.

BACKGROUND ART

In some cases, a ball screw spline is used for a Z-θ actuator used for, for example, a tip shaft of an industrial robot to meet demands for increases in functionality and precision. The ball screw spline includes a shaft, a ball screw nut assembled to the shaft, and a ball spline outer race assembled to the shaft. A rotary input is provided to each of the ball screw nut and the ball spline outer race to control the amount of rotation. Accordingly, the shaft performs arbitrary linear motion (Z), rotary motion (θ), and spiral motion (Z+θ).

A helical ball screw groove and a straight ball spline groove are formed in the shaft in such a manner as to intersect each other. The ball screw nut assembled to the shaft includes a helical ball screw groove facing the ball screw groove in the shaft, and recirculates screw balls that fit in the ball screw groove in the shaft. The ball spline outer race assembled to the shaft includes a straight ball spline groove facing the ball spline groove in the shaft, and recirculates spline balls that fit in the ball spline groove in the shaft.

In order to smoothly actuate the ball screw spline, it is necessary to prevent the screw ball rolling along the ball screw groove from entering the ball spline groove at the intersection of the helical ball screw groove and the straight ball spline groove in the shaft. Moreover, it is necessary to prevent the spline ball rolling along the ball spline groove from entering the ball screw groove. Hence, in a known ball screw spline, the ball screw groove in the shaft is made deeper than the ball spline groove (refer to Patent Literature 1). This is to prevent the screw ball rolling along the ball screw groove from climbing over a level difference between the ball screw groove and the ball spline groove and going off course into the ball spline groove. On the other hand, the spline balls are held by a retainer of the ball spline outer race and, even if the ball spline outer race is pulled out from the shaft, do not fall out of the ball spline outer race. Hence, the spline ball rolling along the ball spline groove does not go off course into the ball screw groove at the intersection.

Moreover, in the known ball spline, the diameter of the ball is dominantly determined by the depth of the groove. Accordingly, as the ball screw groove in the shaft is made deeper than the ball spline groove, the screw ball is made greater in diameter than the spline ball.

CITATION LIST

Patent Literature

Patent Literature 1: JP 62-165057 A

SUMMARY OF INVENTION

Technical Problem

In recent years, a reduction in the inertia of a ball screw spline, that is, reductions in the size and weight of a ball screw spline have been requested. If reductions in the size and weight of, for example, a ball screw spline used for a tip shaft of an industrial robot can be promoted, it is possible to move the industrial robot at high speed and reduce the size of a motor.

However, the known ball screw spline needs to meet the above-mentioned condition for the intersection of the ball screw groove and the ball spline groove in the shaft. Accordingly, there is a problem that limits are imposed on reductions in the size and weight of the ball screw spline.

Hence, an object of the present invention is to provide a ball screw spline whose size and weight reductions can be promoted.

Solution to Problem

In order to solve the above problem, one aspect of the present invention is a ball screw spline including: a shaft formed in such a manner that a helical ball screw groove and a straight ball spline groove intersect each other; a ball screw nut having a helical ball screw groove facing the ball screw groove in the shaft, the ball screw nut being configured to allow recirculating a screw ball fitting in the ball screw groove in the shaft; and a ball spline outer race having a straight ball spline groove facing the ball spline groove in the shaft, the ball spline outer race being configured to allow recirculating a spline ball fitting in the ball spline groove in the shaft, in which the ball screw groove in the shaft is made as deep as or deeper than the ball spline groove in the shaft, and the screw ball is made smaller in diameter than the spline ball.

Advantageous Effects of Invention

According to the present invention, although the ball screw groove in the shaft is as deep as or deeper than the ball spline groove, the screw ball is made smaller in diameter than the spline ball. The ball screw nut and the ball spline outer race are different in recirculation structure. Accordingly, the ball screw nut is likely to be greater in outside diameter than the ball spline outer race. This is because the spline ball rolling along the straight ball spline groove in the shaft can be deflected near the shaft in the spline nut, whereas the screw ball rolling along the helical ball screw groove in the shaft is deflected toward a tangential direction in the ball screw nut. According to the present invention, the screw ball is made smaller in diameter than the spline ball. Accordingly, the outside diameters of both of the ball screw nut and the ball spline outer race can be reduced with a good balance. Therefore, reductions in the size and weight of the ball screw spline can be promoted.

DESCRIPTION OF EMBODIMENT

A ball screw spline of an embodiment of the present invention is described in detail hereinafter with reference to the accompanying drawings. However, the ball screw spline of the present invention can be embodied in various modes, and is not limited to the embodiment described in the description. The embodiment is provided with the intention of enabling those skilled in the art to fully understand the scope of the invention by fully disclosing the description.

Figure 1:
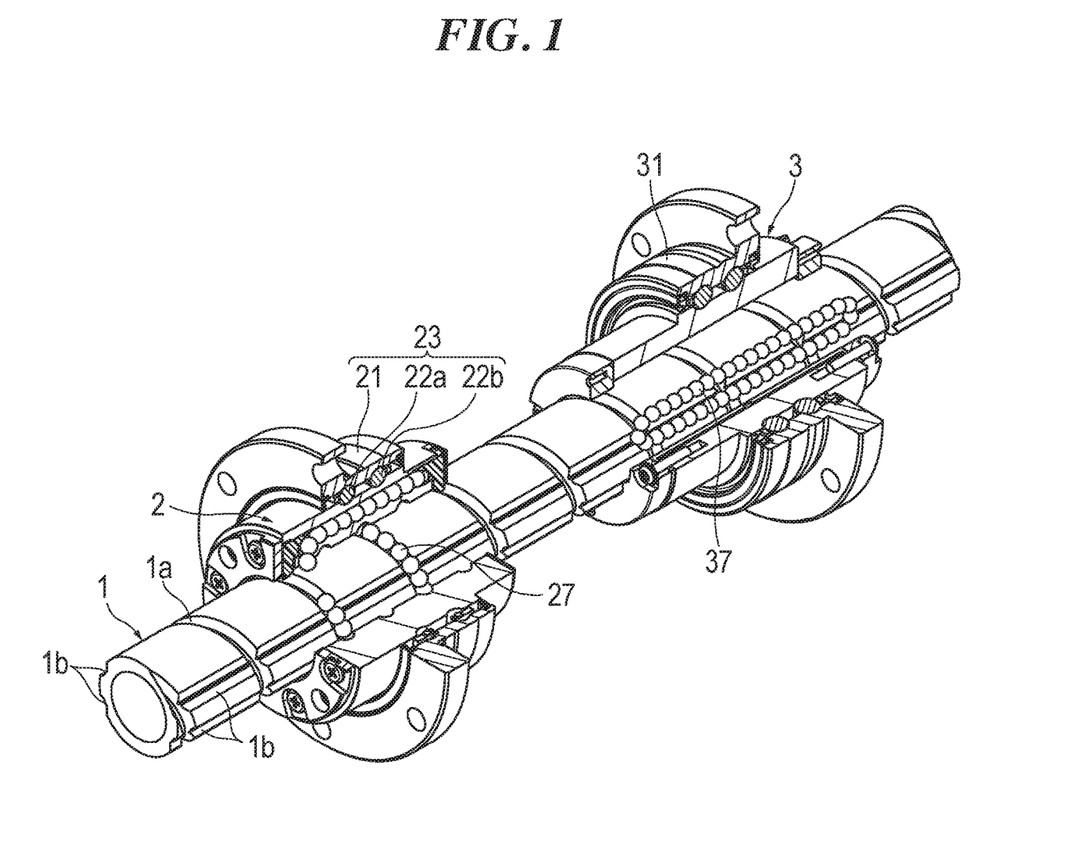
FIG. 1 is a perspective view of a ball screw spline where a screw nut and a spline nut are assembled according to one embodiment of the present invention (an example where the screw nut is placed on the front side).
Figure 2:
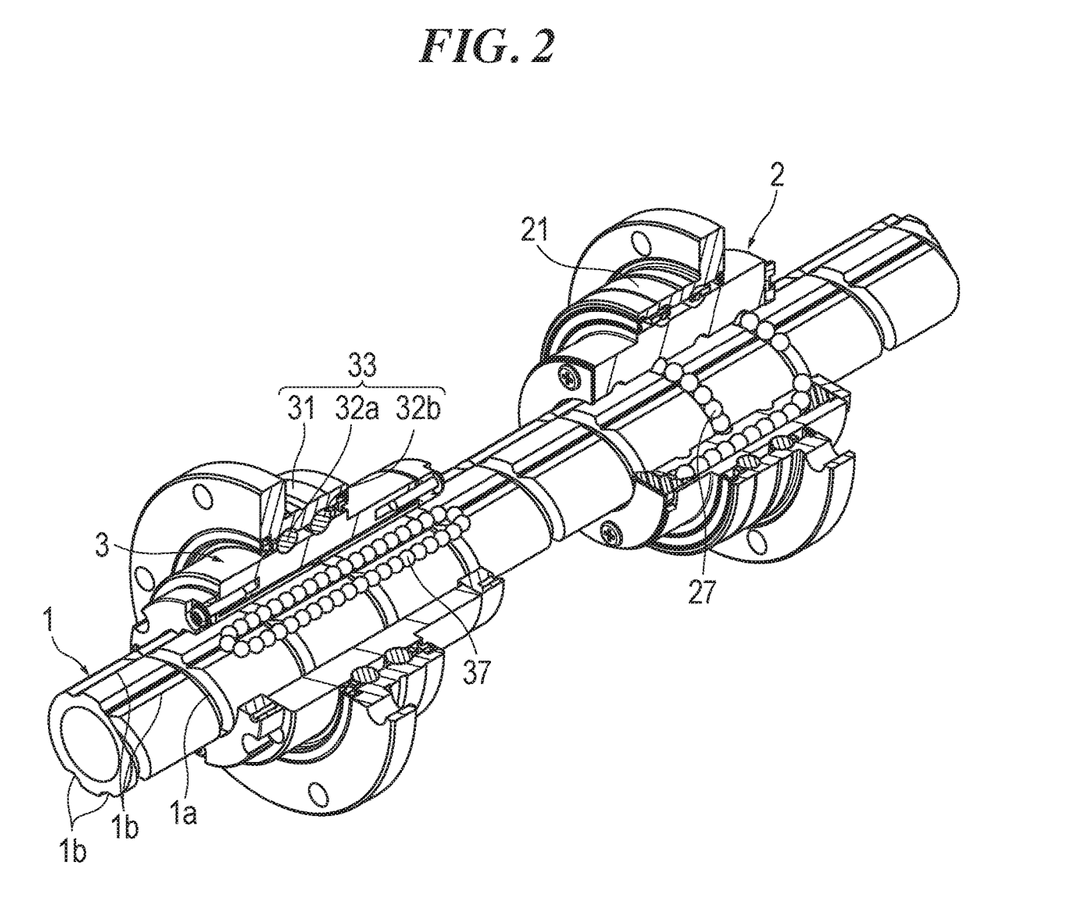
FIG. 2 is a perspective view of the ball screw spline where the screw nut and the spline nut are assembled according to the embodiment (an example where the spline nut is placed on the front side).

FIGS. 1 and 2 illustrate perspective views (partial cross-sectional views) of the ball screw spline of one embodiment of the present invention. FIG. 1 is an example where a ball screw nut 2 (hereinafter simply referred to as the nut 2) is placed on the front side. FIG. 2 is an example where a ball spline outer race 3 (hereinafter simply referred to as the outer race 3) is placed on the front side. In FIGS. 1 and 2, a reference sign 1 denotes a shaft, the reference sign 2 is the nut, and the reference sign 3 is the outer race. A reference sign 23 denotes a bearing that supports the nut 2 rotatably. A reference sign 33 denotes a bearing that supports the outer race 3 in such a manner as to be capable of rotations. The bearings 23 and 33 are mounted on a housing of a Z-θ actuator. For example, an unillustrated pulley is mounted on the nut 2 and the outer race 3 to allow providing a rotary input to the nut 2 and the outer race 3. The shaft 1, the nut 2, and the outer race 3 are described below in turn.

As illustrated in FIG. 1, a helical ball screw groove 1a (hereinafter simply referred to as the screw groove 1a) having a predetermined lead is formed in an outer surface of the shaft 1. Moreover, straight ball spline grooves 1b (hereinafter simply referred to as the spline grooves 1b) extending in the axial direction are formed in the outer surface of the shaft 1. The number of starts of the screw groove 1a of the embodiment is one. The number of the spline grooves 1b is four. However, their numbers are appropriately set according to the specification.

Figure 3:
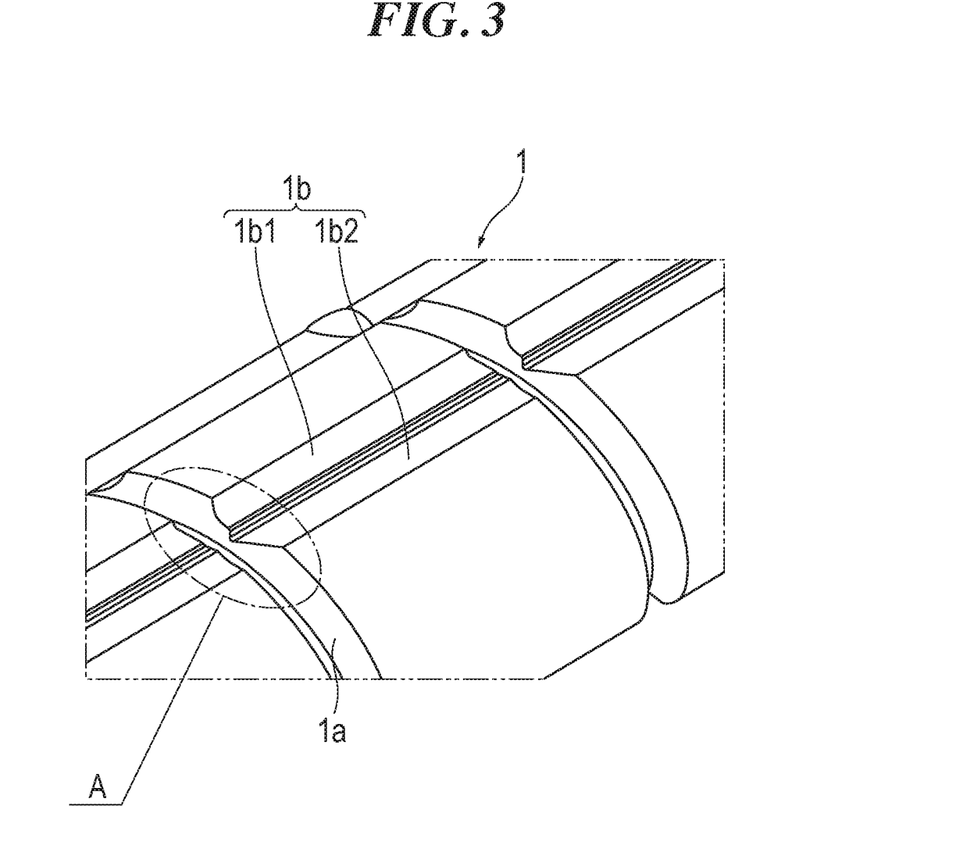
FIG. 3 is an external perspective view of a shaft according to the embodiment.

FIG. 3 illustrates an external perspective view of the shaft. The screw groove 1a has a Gothic arch shape in a cross-sectional view perpendicular to the groove. The spline groove 1b includes a ball rolling portion 1b1 facing a spline ball 37 (refer to FIG. 2), and a retainer facing portion 1b2 adjacent to the ball rolling portion 1b1, the retainer facing portion 1b2 facing a retainer 41 (refer to FIG. 9).

Figure 4A:
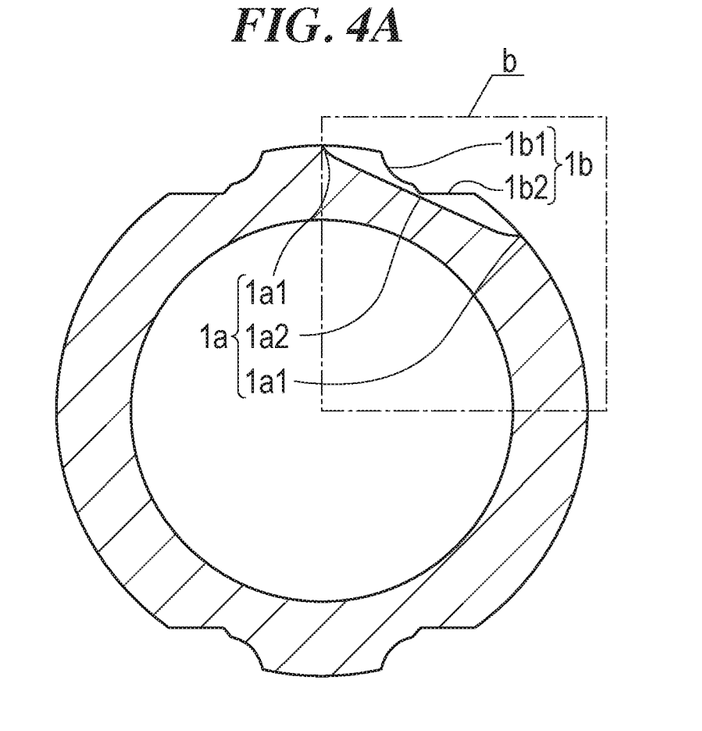
FIG. 4A is a perpendicular axial cross-sectional view of the shaft according to the embodiment.
Figure 4B:
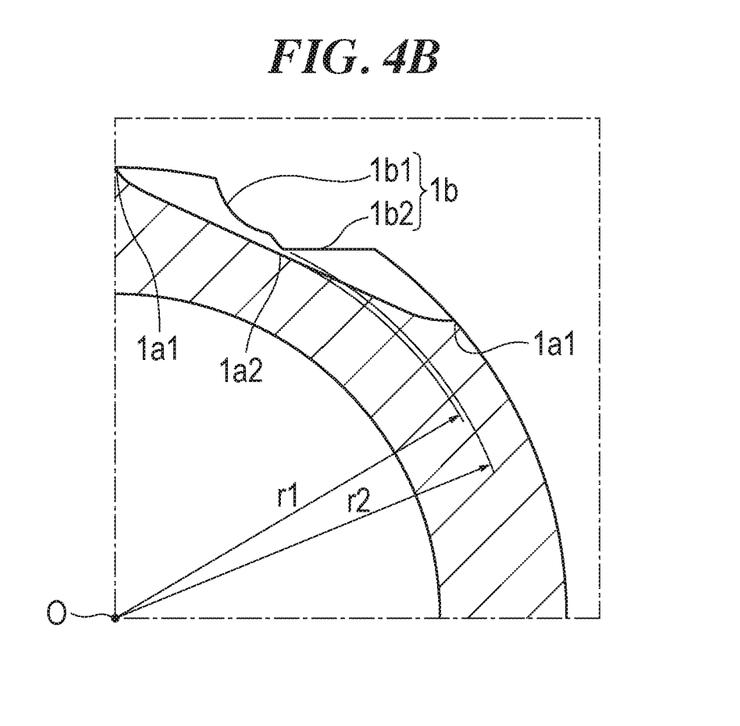
FIG. 4B is an enlarged view of a part b in FIG. 4A.

FIG. 4 illustrates a perpendicular axial cross-sectional view. The screw groove 1a has a substantially straight shape in a perpendicular axial cross-sectional view. A reference sign 1a1 denotes an edge of the screw groove 1a. A reference sign 1a2 denotes a root of the screw groove 1a. Moreover, the ball rolling portion 1b1 of the spline groove 1b has a circular arc shape in cross-section. The retainer facing portion 1b2 of the spline groove 1b has a substantially L shape in cross-section. It is also possible to make the retainer facing portion 1b2 deeper or shallower than the ball rolling portion 1b1. It is also possible to configure the spline groove 1b only with the ball rolling portion 1b1.

As illustrated in FIG. 3, the screw groove 1a and the spline groove 1b intersect at a portion A. At the intersection A, the screw groove 1a is greater in depth than the spline groove 1b, and the screw groove 1a is deeper in the shaft 1 than the spline groove 1b. In other words, as illustrated in FIG. 4, a root diameter r1 of the screw groove 1a (the radius r1 from a center O of the shaft 1 to the root 1a2 of the screw groove 1a) is less than a root diameter r2 of the spline groove 1b (the radius r2 from the center O of the shaft 1 to a root of the spline groove 1b).

As illustrated in FIG. 3, the screw groove 1a is deeper than the spline groove 1b. Accordingly, a screw ball 27 (refer to FIG. 1) rolling along the screw groove 1a is prevented from climbing over the level difference between the screw groove 1a and the spline groove 1b, and going off course into the spline groove 1b. On the other hand, the spline ball 37 is held by the retainer 41 (refer to FIG. 9) of the outer race 3. Accordingly, the spline ball 37 does not fall out of the outer race 3 even if the outer race 3 is pulled out from the shaft 1. Hence, the spline ball 37 rolling along the spline groove 1b does not go off course into the screw groove 1a at the intersection A.

Figure 5:
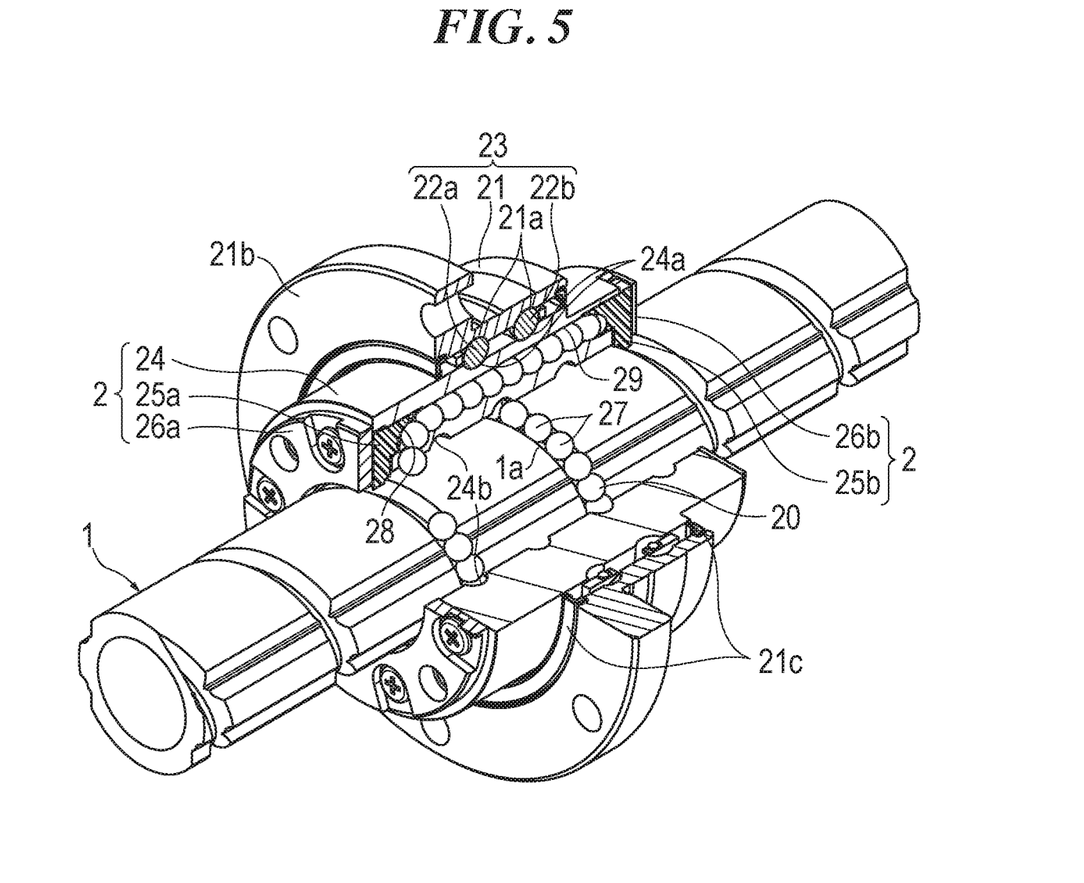
FIG. 5 is an enlarged perspective view of the ball screw nut and the shaft according to the embodiment (a part of the ball screw nut is cut out).

FIG. 5 illustrates an enlarged perspective view (including a partial cross-sectional view) of the nut 2. The nut 2 is rotatably supported by the bearing 23. The bearing 23 includes an outer ring 21 and two rows of bearing balls 22a and 22b. The outer ring 21 has a substantially cylindrical shape, and has a flange 21b at one end thereof in the axial direction. The outer ring 21 is mounted on the housing of the Z-θ actuator via the flange 21b. For example, two outer ring grooves 21a are formed in an inner surface of the outer ring 21. For example, two inner ring grooves 24a facing the outer ring grooves 21a are formed in an outer surface of the nut 2. The two rows of the bearing balls 22a and 22b are disposed between the outer ring grooves 21a and the inner ring grooves 24a in such a manner as to be capable of rolling motion. A seal 21c that blocks a gap between the outer ring 21 and a nut body 24 is mounted on the outer ring 21.

Figure 6:
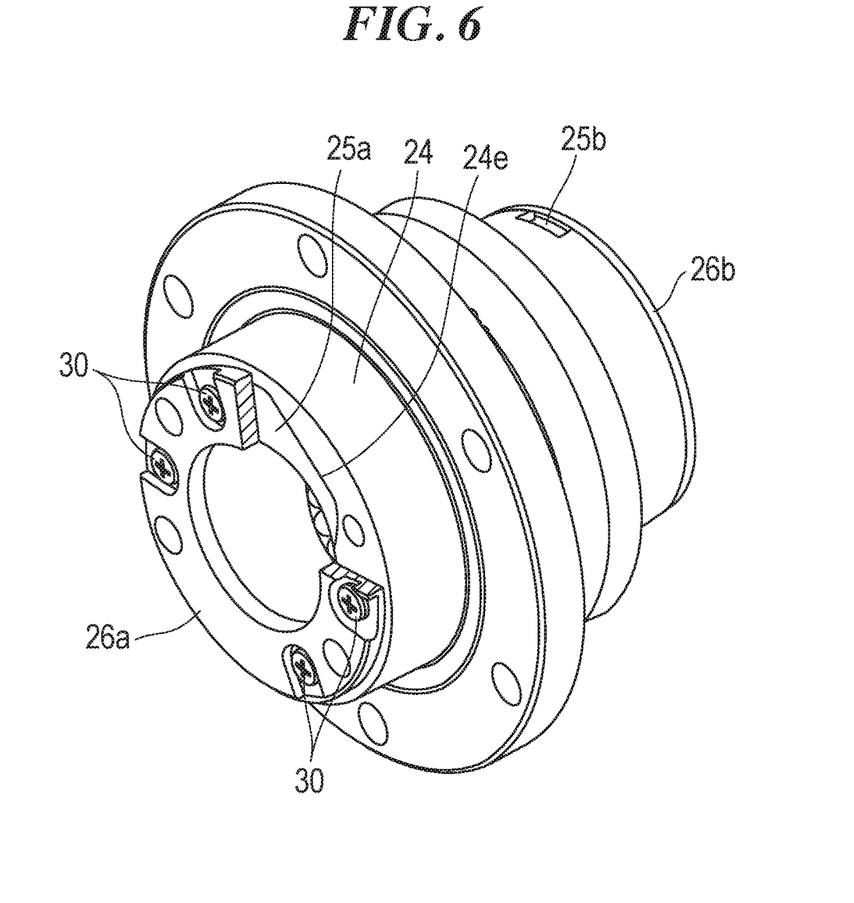
FIG. 6 is an enlarged perspective view of the ball screw nut according to the embodiment (a part of a lid member is cut out).

The nut 2 includes the tubular nut body 24, recirculation components 25a and 25b provided at end portions of the nut body 24 in the axial direction, and lid members 26a and 26b covering the recirculation components 25a and 25b. As illustrated in FIG. 6, the recirculation components 25a and 25b are housed in recesses 24e in end surfaces of the nut body 24 in the axial direction. The recirculation components 25a and 25b are fixed, covered with the ring-shaped lid members 26a and 26b. The lid members 26a and 26b are fastened to the nut body 24 with fastening members 30 such as screws.

As illustrated in FIG. 5, a helical ball screw groove 24b (hereinafter simply referred to as the screw groove 24b) facing the screw groove 1a in the shaft 1 is formed in an inner surface of the nut body 24 (refer also to FIG. 7). The screw ball 27 is disposed between the screw groove 24b in the nut body 24 and the screw groove 1a in the shaft 1 in such a manner as to be capable of rolling motion.

A substantially arc-shaped turn-around path 28 for recirculating the screw ball 27 is formed in each of the recirculation components 25a and 25b. A straight through-hole 29 is formed in the nut body 24, penetrating the nut body 24 in the axial direction. The turn-around paths 28 are connected to the screw groove 24b and the through-hole 29 of the nut body 24.

A helical loaded rolling path 20 between the screw groove 24b and the screw groove 1a in the shaft 1, the substantially arc-shaped turn-around paths 28, and the straight through-hole 29 configure a recirculation path. The turn-around path 28 of the recirculation component 25a deflects the screw ball 27 rolling along the helical loaded rolling path 20 toward a tangential direction, and guides the screw ball 27 to the through-hole 29. The screw ball 27 that has been guided to the through-hole 29 passes through the turn-around path 28 of the opposite recirculation component 25b, and then is returned again to the loaded rolling path 20.

Figure 7A:
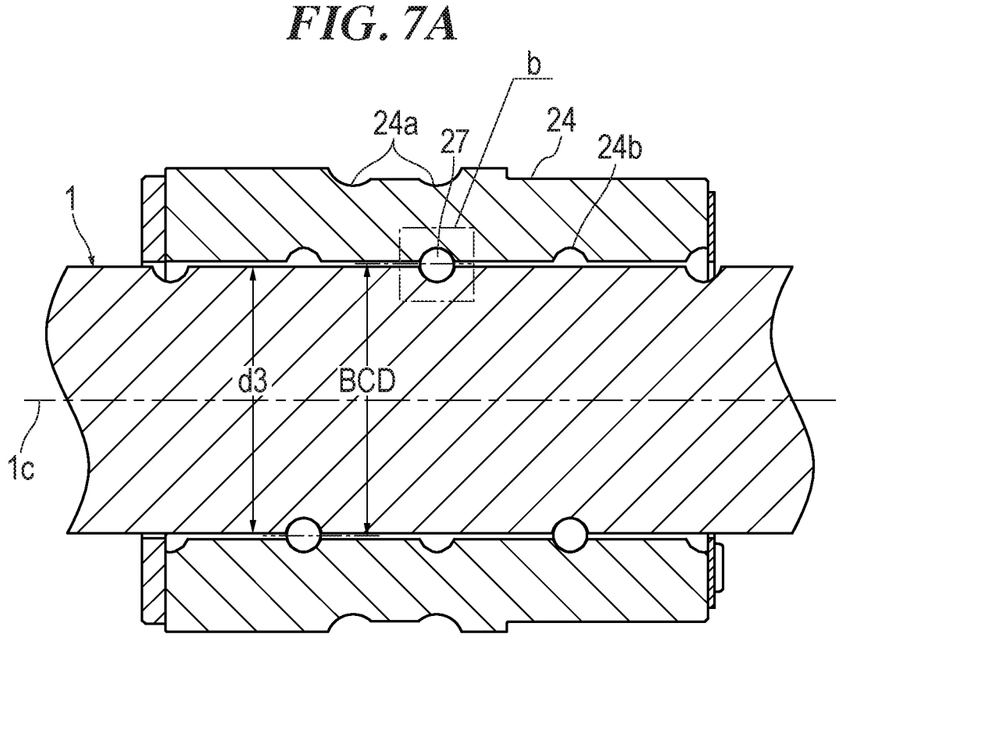
FIG. 7A is a cross-sectional view taken along the axis of a nut body and the shaft according to the embodiment.

FIG. 7 illustrates a cross-sectional view of the nut body 24 along an axis 1c. In a general ball screw, a depth d1 of the screw groove 1a in the shaft 1 is made equal to a depth d2 of the screw groove 24b in the nut body 24. In contrast, in the embodiment, the depth d1 of the screw groove 1a in the shaft 1 is made greater than the depth d2 of the screw groove 24b in the nut body 24. This is to reduce the BCD (Ball Center Diameter; the diameter through a ball center O1 as viewed in the axial direction) of the ball screw including the shaft 1, the nut 2, and the screw ball 27.

Figure 7B:
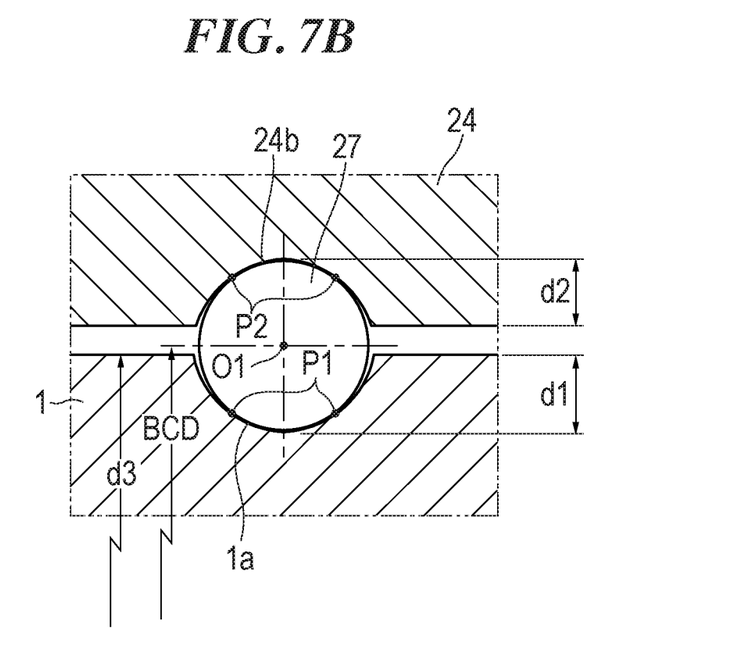
FIG. 7B is an enlarged view of a part b in FIG. 7A.

The cross-section of the screw groove 1a illustrated in FIG. 7B has a Gothic arch shape. The screw ball 27 comes into contact at two points P1 with the screw groove 1a at a predetermined angle of contact. Moreover, the cross-section of the screw groove 24b also has a Gothic arch shape. The screw ball 27 comes into contact at two points P2 with the screw groove 24b at a predetermined angle of contact. If the BCD is reduced, the depth d2 of the screw groove 24b is reduced and edge load may occur. In order to avoid this, the BCD is made greater than a diameter d3 of the shaft 1 to prevent the screw groove 24b from becoming too shallow.

Figure 8:
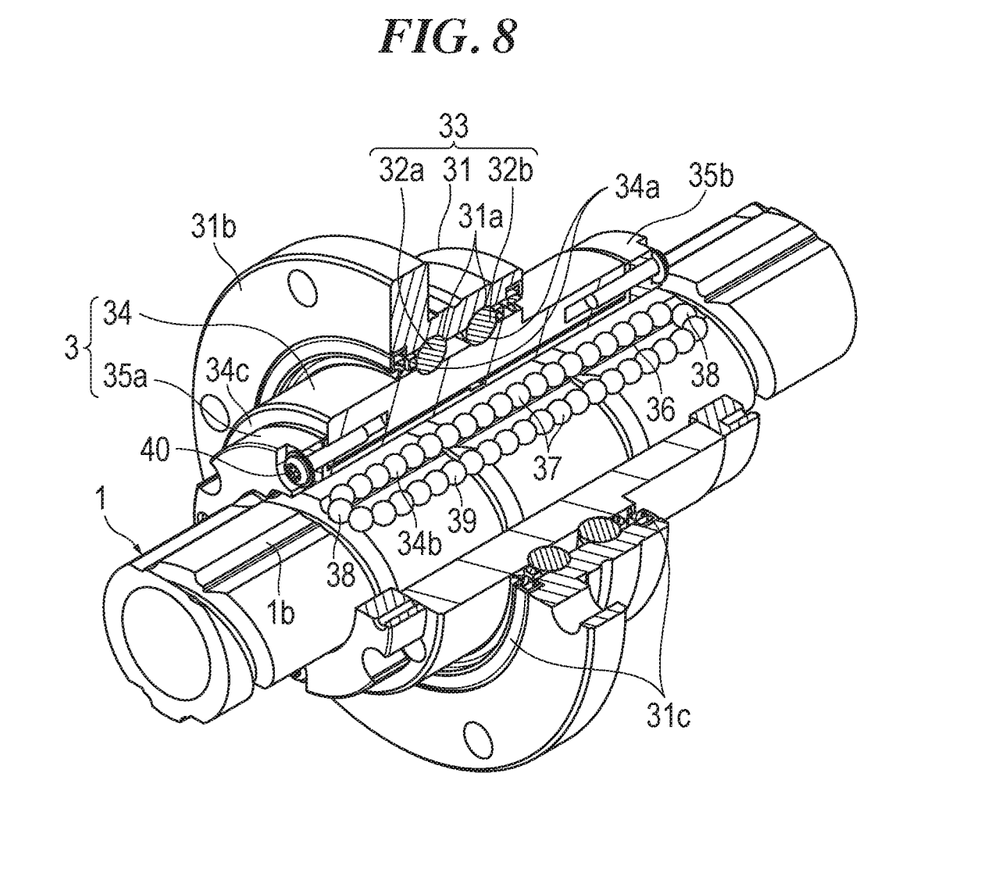
FIG. 8 is an enlarged perspective view of a ball spline outer race and the shaft according to the embodiment (a part of the ball spline outer race is cut out).

FIG. 8 illustrates an enlarged perspective view (including a partial cross-sectional view) of the outer race 3. The outer race 3 is rotatably supported by the bearing 33. The bearing 33 includes an outer ring 31, and two rows of bearing balls 32a and 32b. The outer ring 31 has a substantially cylindrical shape, and has a flange 31b at one end thereof in the axial direction. The outer ring 31 is mounted on, for example, the housing of the Z-θ actuator via the flange 31b. For example, two outer ring grooves 31a are formed in an inner surface of the outer ring 31. For example, two inner ring grooves 34a facing the outer ring groove 31a are formed in an outer surface of the outer race 3. The two rows of the bearing balls 32a and 32b are disposed between the outer ring grooves 31a and the inner ring grooves 34a in such a manner as to be capable of rolling motion. A seal 31c that blocks a gap between the outer ring 31 and an outer race body 34 is mounted on the outer ring 31.

Figure 9:
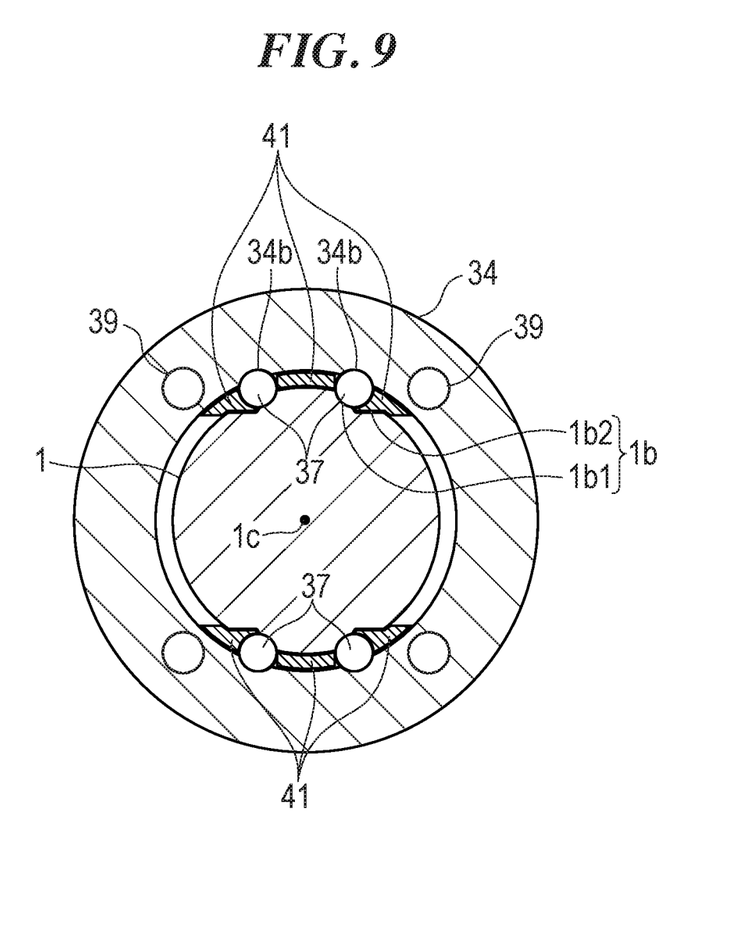
FIG. 9 is a perpendicular axial cross-sectional view of the ball spline outer race and the shaft according to the embodiment.

The outer race 3 includes the tubular outer race body 34, and ring-shaped recirculation components 35a and 35b mounted at end portions of the outer race body 34 in the axial direction. FIG. 9 illustrates a perpendicular axial cross-sectional view of the outer race 3. As illustrated in FIG. 9, a straight ball spline groove 34b (hereinafter simply referred to as the spline groove 34b) that faces the spline groove 1b in the shaft 1 and extends in the axial direction is formed in an inner surface of the outer race body 34. The cross-sections of both of the spline grooves 1b and 34b have a circular arc shape. The spline ball 37 is disposed between the spline grooves 1b and 34b in such a manner as to be capable of rolling motion. The spline ball 37 comes into contact at one point with each of the spline grooves 1b and 34b. The angle of contact of the spline ball 37 is set in such a manner that four rows of the spline balls 37 can carry torque in clockwise and counterclockwise directions.

A straight return path 39 is formed in the outer race body 34, penetrating the outer race body 34 in the axial direction and parallel to the spline groove 34b. The return path 39 is not placed in a radial direction of the spline groove 34b (that is, on a line linking the axis 1c of the shaft 1 and the spline groove 34b) but placed near the shaft 1 in order to reduce the diameter of the outer race body 34.

The retainer 41 is assembled onto the inner surface of the outer race body 34. The retainer 41 holds the spline ball 37 in such a manner as to prevent the spline ball 37 from falling off even if the outer race 3 is pulled out from the shaft 1.

As illustrated in FIG. 8, a U-shaped turn-around path 38 for recirculating the spline ball 37 is formed in each of the recirculation components 35a and 35b. FIG. 8 illustrates the spline balls 37 moving through the U-shaped turn-around paths 38. However, the turn-around path 38 is formed in each of the recirculation components 35a and 35b in reality. The turn-around paths 38 are connected to the spline groove 34b and the return path 39 of the outer race 3.

A straight loaded rolling path 36 between the spline grooves 1b and 34b, the U-shaped turn-around paths 38, and the straight return path 39 configure a recirculation path. The turn-around path 38 of the recirculation component 35a deflects the spline ball 37 rolling along the straight loaded rolling path 36, in a substantially U-shape, and guides the spline ball 37 to the return path 39 near the shaft 1. The spline ball 37 that has been guided to the return path 39 passes through the turn-around path 38 of the opposite recirculation component 35b, and then is returned again to the loaded rolling path 36.

According to the embodiment, although the screw groove 1a in the shaft 1 is deeper than the spline groove 1b, the screw ball 27 is made smaller in diameter than the spline ball 37. The nut 2 and the outer race 3 are different in recirculation structure. Accordingly, the nut 2 is likely to be greater in outside diameter than the outer race 3. This is because the spline ball 37 rolling along the straight spline groove 1b in the shaft 1 is deflected near the shaft 1 in the outer race 3, whereas the screw ball 27 rolling along the helical screw groove 1a in the shaft 1 is deflected toward the tangential direction in the nut 2. According to the embodiment, the screw ball 27 is made smaller in diameter than the spline ball 37. Accordingly, the outside diameters of both of the nut 2 and the outer race 3 can be reduced with a good balance. Therefore, reductions in the size and weight of the ball screw spline can be promoted.

In order to increase the depth of the screw groove 1a in the shaft 1, either an increase in the diameter of the screw ball 27 or a reduction in BCD is required. According to the embodiment, the depth d1 of the screw groove 1a in the shaft 1 is greater than the depth d2 of the screw groove 24b in the nut 2. Accordingly, the BCD of the ball screw is reduced. Hence, the depth of the screw groove 1a in the shaft 1 can be increased without increasing the diameter of the screw ball 27.

The BCD of the ball screw is greater than the diameter d3 of the shaft 1. Accordingly, it is possible to prevent occurrence of edge load on the screw groove 24b in the nut 2 due to the excessively shallow screw groove 24b in the nut 2.

The cross-section of the ball screw groove 1a in the shaft 1 has a Gothic arch shape. At least part of the cross-section of the spline groove 1b in the shaft 1 has a circular arc shape. Accordingly, the screw groove 1a in the shaft 1 can be made deeper than the spline groove 1b.

The present invention is not limited to the realization of the above embodiment, and can be modified into other embodiments within the scope that does not change the spirit of the present invention.

In the above embodiment, the screw groove in the shaft is made deeper than the spline groove in the shaft. However, it is also possible to make the depth of the screw groove in the shaft equal to the depth of the spline groove in the shaft. The screw ball is guided by not only the screw groove in the shaft but also the screw groove in the nut. Accordingly, even if they are made equal, it is possible to prevent the screw ball from changing course from the screw groove to the spline groove at the intersection.

In the above embodiment, the cross-sections of the spline grooves in the shaft and the outer race are formed into a circular arc shape, but can also be formed into a Gothic arch shape. Moreover, the cross-sections of the screw grooves in the shaft and the nut are formed into a Gothic arch shape, but can also be formed into a circular arc shape.

The description is based on Japanese Patent Application No. 2017-227937 filed on Nov. 28, 2017, the entire contents of which are incorporated herein.

REFERENCE SIGNS LIST

1 Shaft
1a Ball screw groove in the shaft
1b Ball spline groove in the shaft
2 Ball screw nut
3 Ball spline outer race
24b Ball screw groove in the ball screw nut
34b Ball spline groove in the outer race
27 Screw ball
37 Spline ball

The invention claimed is:

1. A ball screw spline comprising:
a shaft formed in such a manner that a helical ball screw groove and a straight ball spline groove intersect each other;
a ball screw nut including a helical ball screw groove facing the ball screw groove in the shaft, the ball screw nut being configured to allow recirculating a screw ball fitting in the ball screw groove in the shaft; and
a ball spline outer race including a straight ball spline groove facing the ball spline groove in the shaft, the ball spline outer race being configured to allow recirculating a spline ball fitting in the ball spline groove in the shaft,
wherein the ball screw groove in the shaft is as deep as or deeper than the ball spline groove in the shaft,
the screw ball is smaller in diameter than the spline ball, the ball screw groove in the shaft is deeper than the ball screw groove in the ball screw nut, and
a center of the screw ball is radially outside of an outer surface of the shaft.

2. A ball screw spline comprising:
a shaft formed in such a manner that a helical ball screw groove and a straight ball spline groove intersect each other;
a ball screw nut including a helical ball screw groove facing the ball screw groove in the shaft, the ball screw nut being configured to allow recirculating a screw ball fitting in the ball screw groove in the shaft; and
a ball spline outer race including a straight ball spline groove facing the ball spline groove in the shaft, the ball spline outer race being configured to allow recirculating a spline ball fitting in the ball spline groove in the shaft,
wherein the ball screw nut includes
a nut body in which the ball screw groove is formed and in which a through-hole penetrating the nut body in an axial direction is formed, and
a recirculation component provided at end portions of the nut body in the axial direction and including a turn-around path connected to the screw groove and the through-hole of the nut body,
the ball screw groove in the shaft is as deep as or deeper than the ball spline groove in the shaft,
the screw ball is smaller in diameter than the spline ball, and
the ball screw groove in the shaft is deeper than the ball screw groove in the ball screw nut.

3. The ball screw spline according to claim 2, wherein a center of the screw ball is radially outside of an outer surface of the shaft.

4. The ball screw spline according to claim 1, wherein
a cross-section of the ball screw groove in the shaft has a Gothic arch shape, and
at least part of a cross-section of the ball spline groove in the shaft has a circular arc shape.

5. The ball screw spline according to claim 2, wherein
a cross-section of the ball screw groove in the shaft has a Gothic arch shape, and
at least part of a cross-section of the ball spline groove in the shaft has a circular arc shape.

6. The ball screw spline according to claim 3, wherein
a cross-section of the ball screw groove in the shaft has a Gothic arch shape, and
at least part of a cross-section of the ball spline groove in the shaft has a circular arc shape.

* * * * *